United States Patent
Schiff et al.

(10) Patent No.: US 11,353,623 B2
(45) Date of Patent: Jun. 7, 2022

(54) WEATHER DETECTION AND INTENSITY EVALUATION

(71) Applicant: Hailios Inc., Colorado Springs, CO (US)

(72) Inventors: Lucas Schiff, Monument, CO (US); Carsten Neufing, Niederwil (CH)

(73) Assignee: Hailios Inc., Colorado Springs, CO (US)

( * ) Notice: Subject to any disclaimer, the term of this patent is extended or adjusted under 35 U.S.C. 154(b) by 0 days.

(21) Appl. No.: 16/365,536

(22) Filed: Mar. 26, 2019

(65) Prior Publication Data

US 2020/0081153 A1   Mar. 12, 2020

Related U.S. Application Data

(60) Provisional application No. 62/728,447, filed on Sep. 7, 2018.

(51) Int. Cl.
| | | |
|---|---|---|
| *G01W 1/02* | (2006.01) | |
| *G01D 9/00* | (2006.01) | |
| *G01D 1/00* | (2006.01) | |
| *G01H 11/08* | (2006.01) | |

(52) U.S. Cl.
CPC ............ *G01W 1/02* (2013.01); *G01D 1/00* (2013.01); *G01D 9/005* (2013.01); *G01H 11/08* (2013.01)

(58) Field of Classification Search
CPC ......... G01W 1/02; G01H 11/08; G01D 9/005; G01D 1/00
See application file for complete search history.

(56) References Cited

U.S. PATENT DOCUMENTS

| | | | |
|---|---|---|---|
| 7,286,935 B2 | 10/2007 | Aspola et al. | |
| 7,486,220 B1* | 2/2009 | Kronfeld | G01S 13/953 |
| | | | 342/26 B |
| 9,583,020 B1* | 2/2017 | Kronfeld | G09B 19/00 |
| 9,632,211 B2 | 4/2017 | Loffler-Mang et al. | |
| 9,784,887 B1* | 10/2017 | Ulmer | G01S 7/4813 |
| 9,846,092 B2 | 12/2017 | Kubicek et al. | |
| 2006/0241875 A1* | 10/2006 | Aspola | G01W 1/14 |
| | | | 702/50 |
| 2009/0113990 A1* | 5/2009 | Groves | G01N 1/26 |
| | | | 73/31.01 |
| 2011/0267224 A1* | 11/2011 | Venkatachalam | G01S 13/951 |
| | | | 342/26 R |
| 2012/0031181 A1* | 2/2012 | Salmi | G01W 1/14 |
| | | | 73/170.17 |
| 2012/0272726 A1* | 11/2012 | Cullen | G01W 1/14 |
| | | | 73/170.21 |
| 2014/0007703 A1* | 1/2014 | Martin | G01W 1/14 |
| | | | 73/862.621 |
| 2014/0167969 A1* | 6/2014 | Wedig | G08B 7/066 |
| | | | 340/584 |

(Continued)

*Primary Examiner* — Eyob Hagos
(74) *Attorney, Agent, or Firm* — Edell, Shapiro & Finnan, LLC

(57) ABSTRACT

Embodiments disclosed herein may relate to weather sensors and particularly to methods and systems related to collecting weather data and other site-specific data. The system may also be used to collect data on hydrometeors, especially hail. Some, but not all of the things a system described can determine are the kinetic energy, diameter, mass, and velocity.

21 Claims, 10 Drawing Sheets

(56) References Cited

U.S. PATENT DOCUMENTS

| | | | |
|---|---|---|---|
| 2014/0260596 A1* | 9/2014 | Kubicek | G01P 13/02 |
| | | | 73/170.16 |
| 2015/0309208 A1* | 10/2015 | Sneed | G01C 21/3691 |
| | | | 702/3 |
| 2016/0070026 A1* | 3/2016 | Loffler-Mang | G01W 1/14 |
| | | | 73/170.17 |
| 2016/0247273 A1* | 8/2016 | Fallgatter | G06K 9/6267 |
| 2016/0327687 A1* | 11/2016 | Nylander | G01W 1/14 |
| 2017/0108419 A1* | 4/2017 | Martin | G01N 3/30 |
| 2017/0118930 A1* | 5/2017 | Bangalore | G05D 7/0635 |
| 2018/0059287 A1* | 3/2018 | Wolf | G01W 1/14 |
| 2018/0266903 A1* | 9/2018 | Kubicek | G01W 1/02 |
| 2019/0277964 A1* | 9/2019 | Badin | G01S 7/412 |

* cited by examiner

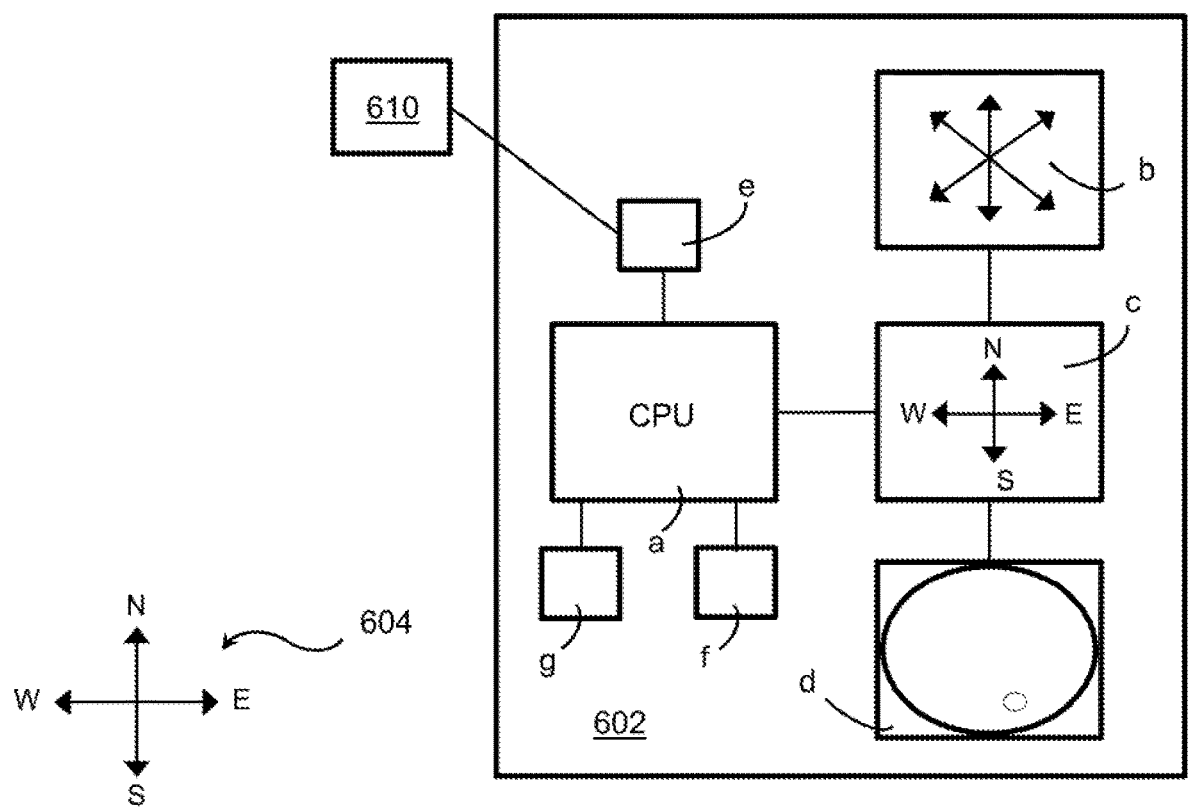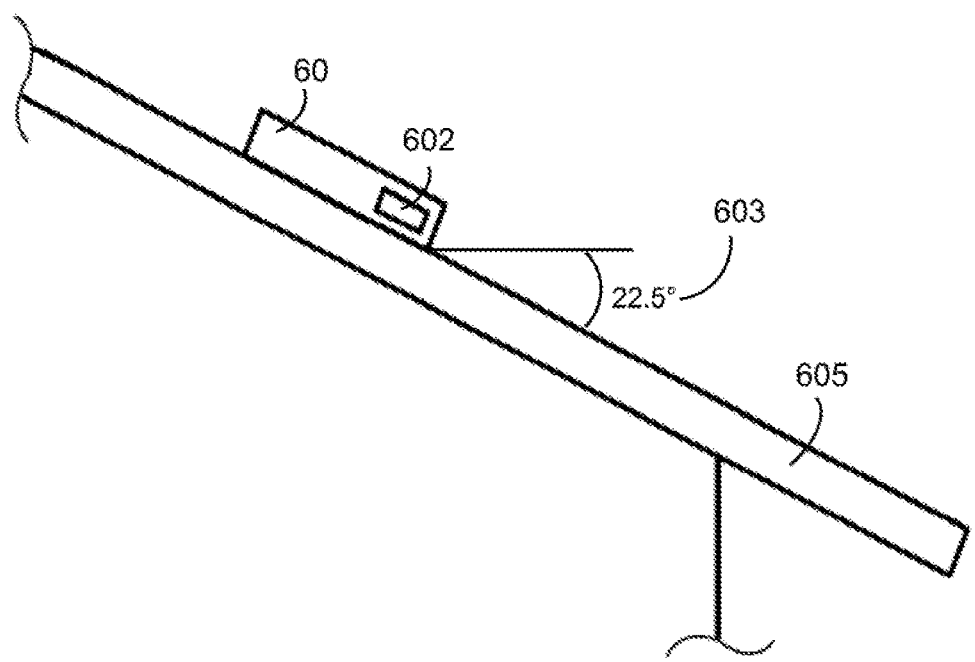
FIG. 6

WEATHER DETECTION AND INTENSITY EVALUATION

CROSS REFERENCE TO RELATED APPLICATIONS

This application claims the benefit of U.S. Provisional Patent Application No. 62/728,447, filed on Sep. 7, 2018, which is incorporated herein by reference for all purposes.

FIELD

The present disclosure relates to systems and methods in which a measuring device detects hydrometeors, or hail, or other weather data.

BACKGROUND

In general, weather data is used by several different types of entities, including, but not limited to, government entities and private entities in a variety of different industries for analysis and informational purposes to assist them. Some examples include insurance companies, energy producers, agriculture, transportation, logistics, and research institutions.

Furthermore, hail has been the most difficult to gain accurate measurements of time of impact, distribution, and size due to extreme irregularities in weather patterns. Hail detection and intensity on the ground has not been accurate in a scale that would provide substantial positive effect to weather forecasting, insurance, early warning systems, verification of events, and meteorology as a whole.

Traditionally, hail is detected through a combination of surface-based radar, satellite imagery, ground observation by weather spotters, and recently, social media reports.

In other technology, mechanical strain, as described in U.S. Pat. No. 9,846,092B2, is used to determine the presence of hail but is both limited in its ability to determine size accurately and ability to scale due to its overall cost.

Similarly, other conventional technology, an impact surface and sensor element, as described in U.S. Pat. No. 7,286,935B2, is used to determine the presence of hail but is both limited in its ability to determine size accurately and ability to scale due to its overall cost.

Again, other conventional technology, an impact surface and sensor element, as described in U.S. Pat. No. 9,632,211B2, is used to determine kinetic energy of hail but requires several expensive pieces of hardware and is limited in its detection ability by the use of successive measurement time intervals and limited in its ability to scale due to its overall cost.

While each of these technologies exhibit an ability to detect hail, they have not been further refined into a solution that can accurately detect hail and its kinetic energy, while also combining several components into a system that is inexpensive to manufacture and deploy.

SUMMARY

It is with respect to the above issues and other problems presently faced by those of skill in the pertinent art that the embodiments presented herein were contemplated. Embodiments of the present invention solve the problems associated with the prior art and provides a method that combines accurate hail detection and other site-specific measurements and parameters, while also being inexpensive to manufacture. Other advantages and benefits are described in the following disclosure.

Accordingly, the present disclosure relates to systems and methods that overcome the problems identified above. Embodiments disclosed herein relate to weather sensors and particularly, but not exclusively, methods and systems related to collecting weather data and other site-specific data. This disclosure also relates to a system used to collect data on hydrometeors, especially hail. Some, but not all of the things a system described can determine are the kinetic energy, diameter, mass, and velocity of hail.

In some embodiments, the sensor system, including one or more vibration sensors, consists of a plate, typically with square or rectangular geometry, that is mounted to a roof surface, roof mounted equipment, building mounted equipment, or in close proximity of a building in order to monitor the roof or building for any damage, or inversely, lack of damage that may be caused by hydrometeors, especially hail. The sensor system may be mounted in a location where hail may not be impeded by other structures, trees, etc.

In some embodiments, one or more vibration sensors are mounted to the underside surface of the plate. The unique vibrations of each hydrometeor impact are transferred through the plate to the vibration sensor(s). In some embodiments, the sensor signals are filtered to extract the signal components correlating best with the intensity of the hydrometeor impact.

In some embodiments, the system may be required to be mounted to roof structures. Additionally, the system may be required to be mounted without penetrating the roof structure or barrier layer, especially asphalt shingles on residential homes.

In such embodiments as previously described, a roof mounting system for the sensor system contain a bracket or Velcro (hook and loop-type fastener) pads/stripes, a flexible material, and an adhesive. The purpose of the combined roof mounting system is to provide rigid connectivity of the sensor system to the bracket or hook and loop fastener pads/stripes and a flexible connectivity from bracket to flexible material. The flexible material is then affixed to the roof surface with specialty adhesive to give it the ability to conform to the various textures and layouts of asphalt shingles without compromising the integrity of the roof structure and barrier layer.

In some embodiments, with many sensors in a regional area, it is possible to generate early warning notifications to various entities such as, but not limited to, government entities and private entities. In the case of government entities, a warning system may be used in several applications, but not exclusively, to alert the general public of incoming storm threats, assistance to aviation entities both for ground crew and also incoming/outbound aircraft safety, and disaster response.

In the case of private entities, a warning system may be used in several applications, including to alert its users or customers of incoming storm threats and provide actionable advice, in automation of preventative devices to reduce property damage, in automation of preventative methods to reduce property damage, in automation methods on autonomous vehicles to prevent vehicle damage, in automation methods on navigational systems to avoid damage or injury, and in automation methods on logistics vehicles to avoid damage or delay.

Embodiments of the present disclosure also disclose a method for obtaining weather related data as detected by the hydrometeor sensor. Upon impact from a hydrometeor or rain on the impact surface, vibrations are translated into electrical waves by the sensors attached to the impact surface. Raw sensor signals are then processed by an onboard CPU, which may include AC to DC units to convert the analog electrical waves into digital format. Once in digital format, an on-board algorithm within the CPU analyzes the digital format and interpolates various attributes, including but not limited to, hydrometeor size, frequency, density, mass, and/or velocity, from an on-board lookup table. After the attributes have been interpolated, this data is sent to secondary non-volatile flash memory where it is stored and will be transferred to centralized servers for further analysis or may be recalled from the device at a later time.

It is to be expressly understood that the ensuing description provides embodiments only, and is not intended to limit the scope, applicability, or configuration of the invention. Rather, this summary will provide those skilled in the art with an enabling description for implementing the embodiments. It should be understood that various changes may be made in the function and arrangement of elements without departing from the spirit and scope of the appended claims.

Furthermore, while embodiments of the present disclosure will be described in connection with various examples, it should be appreciated that embodiments of the present disclosure are not intended to be limited in any way. While the invention is described in terms of exemplary embodiments, it should be appreciated that individual aspects of the invention may be separately claimed.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings, given below, serve to explain the principles of the disclosure.

In the drawings:

FIG. 1 is a diagram depicting a typical plate surface used for collecting data, according to an embodiment.

FIG. 2 is an exemplar of raw sensor signals for different hail diameters, according to an embodiment.

FIG. 3 is an exemplar of raw sensor signals for different sensor position, according to an embodiment.

FIG. 4 is another exemplar of raw sensor signals for different sensor position, according to an embodiment.

FIG. 5 is yet another exemplar of raw sensor signals for different sensor position, according to an embodiment.

FIG. 6 is a perspective view of a hydrometeor sensor mounting to a pitched roof surface, according to an embodiment.

FIG. 7 is a perspective view of a hydrometeor sensor mounting to a flat roof surface, according to an embodiment.

FIG. 8 is an exploded view of a hydrometeor sensor assembly, according to an embodiment.

FIG. 9 is a perspective view of an early warning system, according to an embodiment.

FIG. 10 is a flowchart of a method for capturing data of a hydrometeor sensor, according to an embodiment.

Figure 1:
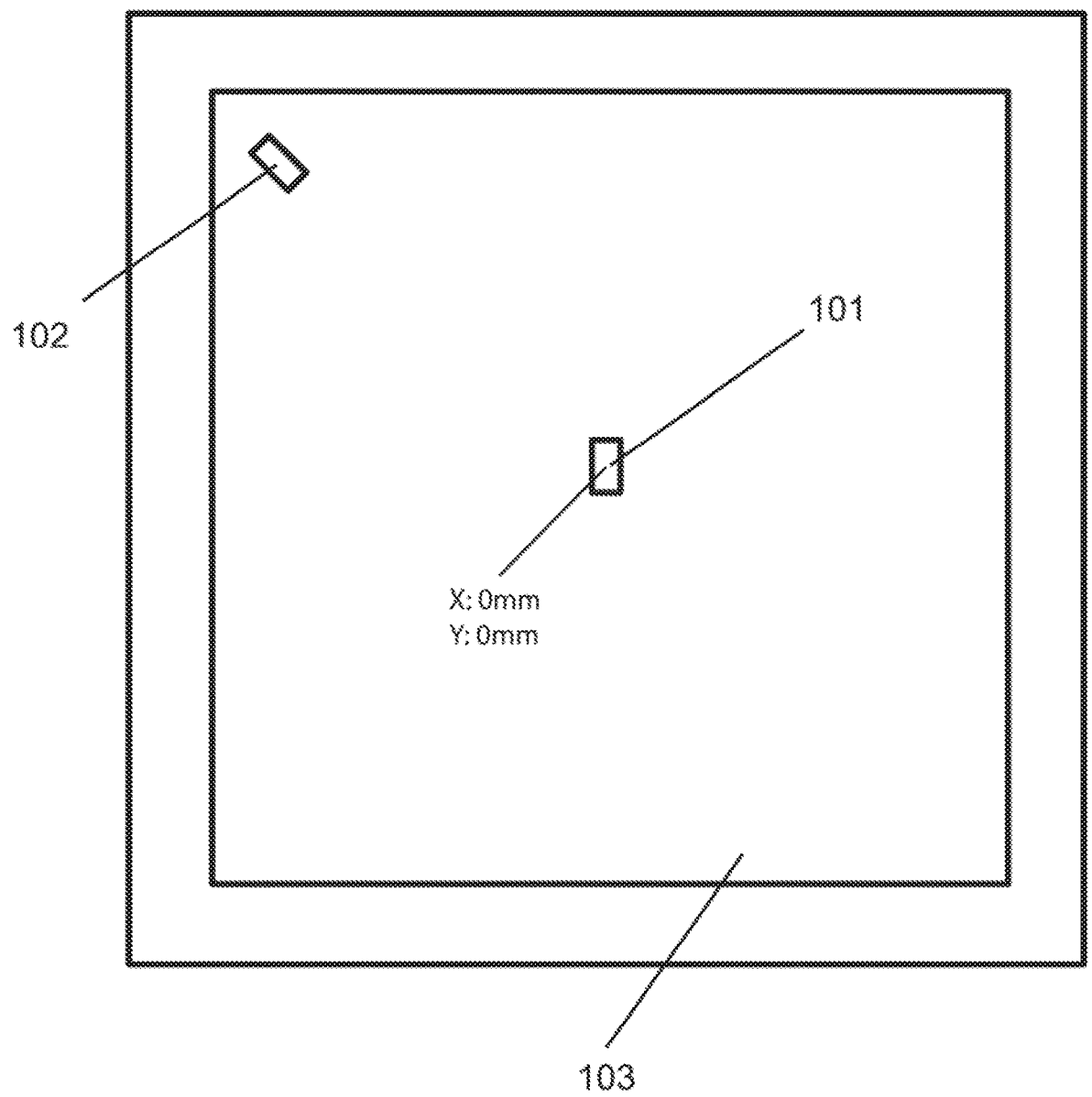

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

Embodiments of the present disclosure provide its benefits across a broad spectrum of endeavors. It is applicants' intent that this specification appended hereto be accorded a breadth in keeping with the scope and spirit of the disclosure being disclosed despite what might appear to be limiting language imposed by the requirements of referring to the specific examples disclosed. Thus, to acquaint persons skilled in the pertinent arts most closely related to the present disclosure, an embodiment of the system is disclosed for the purpose of illustrating the nature of the disclosure. The exemplary methods of installing, assembling and operating the system is described in detail according to the embodiment, without attempting to describe all of the various forms and modifications in which the disclosure might be embodied. As such, the embodiments described herein are illustrative, and as will become apparent to those skilled in the art, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this disclosure using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this disclosure is referred to in this disclosure in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, subparagraph (f).

Referring now to the drawings, FIG. 1 is a diagram depicting an example system 100, which may include a plate 103, comprising an upper and lower surface, used for collecting data from hydrometeor impacts and other weather data.

System 100 may also include example sensors 101 and 102 located on the lower surface of the plate 103. In some embodiments, there will be two or more sensors 101 and 102. When two or more sensors 101 and 102 are present, one may be located in the center of the plate 103 and the other(s) may be located adjacent the corner(s) of the plate 103. This may offer a variation in vibration to be transferred to the two or more sensors 101 and 102 and can achieve higher accuracy to determine or estimate the kinetic energy, diameter, velocity, mass, frequency, number, and/or density of impacting hydrometeors or rain or other weather element.

In some embodiments, the plate surface 103 is of square geometry. In other embodiments, the plate surface 103 is of rectangular geometry. Other geometries for the plate 103 may be used. In some embodiments, the plate surface 103 is mounted adjacent a roof surface, roof mounted equipment, building mounted equipment, or in close proximity of a building, in order to monitor the roof or building for any damage, or inversely, lack of damage that may be caused by hydrometeors, especially hail, as described in FIGS. 6-8.

In some embodiments, the plate surface 103 consists of completed products that already exist as stand-alone products including, but not exclusively, solar electric panels, roofing materials and products, ventilation, or HVAC, and/or other structures, surfaces, etc. suitable for use in detecting weather. These are used for the purpose of collecting data utilizing commonly available products as an impact surface and combining the use of these products into a singular system 100 in order to dramatically decrease the cost of detecting and evaluating hydrometeor intensity and other weather data.

In an embodiment where the plate surface 103 consists of a solar electric panel, there is an additional reduction in manufacturing cost of the system by combining the power source of the solar electric panel and the impact detection surface, thereby eliminating the need for an additional power source.

Furthermore, the system 100 contains a method to provide a fail-over in the case of a faulty sensor. In this method the system 100 detects abnormal behavior of a sensor, and uses information from other available sensors for evaluation.

In some embodiments, one or more vibration sensors 101 and 102 are mounted to the underside surface of the plate surface 103. The unique vibrations of each hydrometeor impact are transferred through the plate 103 and detected by the vibration sensor(s) 101 and 102.

In some embodiments, the one or more sensors 101, 102 may be located on the underside surface of the plate 103, and may be configured to detect vibrations from a plurality of hydrometeor impacts on the plate 103. The vibrations may be translated by the one or more sensors 101, 102 into electrical wave data. The electrical wave data may then be transferred, via a communication link, to the analog-to-digital (ADC) converter and converted to digital vibration data. The digital vibration data may then be transferred, via a communication link, to an on-board central processing unit, which receives the digital vibration data.

The on-board central processing unit then analyzes the digital vibration data, at least in part by interpolating attributes of the digital vibration data to a lookup table accessible by the central processing unit, to create interpolated digital vibration data. The on-board central processing unit then creates composite data from the interpolated digital vibration data, sends the composite data to non-volatile flash memory to be stored, and transfers the composite data to one or more centralized servers via one or more networks for further analysis.

In some embodiments, the composite data comprises one or more of kinetic energy, diameter, velocity, mass, frequency, number, of the impacting hydrometeors, and/or density of the impacting hydrometeors, and/or other weather data.

In some embodiments, vibration sensors 101 and 102 can include, but are not limited to, accelerometers (piezoelectric accelerometer, piezoresistive accelerometer, and capacitive MEMS), strain gauges, velocity sensors, gyroscopes, microphone or pressure sensors, laser displacement sensors, and eddy current or capacitive displacement sensors, and/or other sensor capable of detecting weather data.

In some embodiments, the raw digital signals from the ADC units are then recorded by a microcontroller that evaluates the sensor signals immediately in order to assess the intensity of the hydrometeor impact, and/or other data.

In some embodiments, the sensor signals are filtered to extract the signal components correlating best with the intensity of the hydrometeor impact, and other weather data. Furthermore, the signal energy data of the filtered signals is used as the main hydrometeor intensity gauging feature.

In some embodiments, two or more vibration sensors 101 and 102 are combined to average the signal strength in case of a direct impact. This may remove the probability of over excitement, or railing, of the vibration sensor 101 and 102 with a direct impact and creating a false reading showing a higher intensity energy value than actual.

Furthermore, in the case of two or more vibration sensors 101 and 102, the hydrometeor intensity features derived from each individual sensor 101 and 102 may be combined to a single intensity feature, where the specific implementation of this step depends on the chosen sensor position and the vibration characteristics of the entire system (plate+plate mounting).

In some embodiments, one specific implementation is given for the case of a quadratic plate 103 with one central sensor 101 and a second sensor 102 in close proximity to one corner of the plate 103. In this case, the hydrometeor intensity feature from the central sensor 101 is chosen as the total hydrometeor intensity, unless its hydrometeor feature is significantly larger than the hydrometeor intensity feature of the second sensor 102. In the latter case, both hydrometeor intensity features are averaged to obtain the total hydrometeor intensity, especially in the case of hail.

In some embodiments, the total hydrometeor intensity feature is mapped into a meaningful physical interpretation. A meaningful physical interpretation can be, but not exclusively, the kinetic energy, diameter, or mass of the impacting hydrometeor assuming a standardized velocity and density of the impacting hydrometeor, and/or other weather data. Furthermore, this mapping can be implemented by an interpolated look-up table which gives sufficient freedom to tune the intensity assessment to the vibrational characteristics of the entire system 100.

In some embodiments, the sensor system comprises a barometric pressure sensor. The sensor may be used to collect site specific data of fluctuations in atmospheric pressure and/or other weather data.

In some embodiments, the sensor system comprises a global positioning system (GPS) radio and antenna. The GPS radio provides accurate coordinate location data of each sensor equipped with it, without the need for a user or installer to provide address data manually. Furthermore, in combination with the barometric pressure sensor, the system can provide accurate altitude for the sensor location.

In some embodiments, the sensor system comprises an accelerometer and magnetometer. This combination provides both orientation and degrees of tilt relative to zero or to the ground. These two pieces of data may be important for detecting the direction hydrometeors impact the plate surface and how the hydrometeor impacts affect the structure where the system 100 is located. For example, in the insurance industry, it is critical to understand the angle of a roof and the direction of hydrometeor impact, especially hail, to adequately process claims after significant hail storms.

In some embodiments, the sensor system comprises a temperature sensor. When mounted to a roof structure, this sensor monitors the temperature of the surface of the roof. This provides valuable data in combination with the other data collected by the sensor system. With the roof surface temperature being monitored, it is possible to see the temperature differential of the before, during, and after effects of a storm, as well as historical data of a roofs surface temperature.

In some embodiments, the sensor system comprises the ability to add or connect additional internal or external sensors, such as wind, seismic, air quality, and other environmental sensors.

Figure 2:
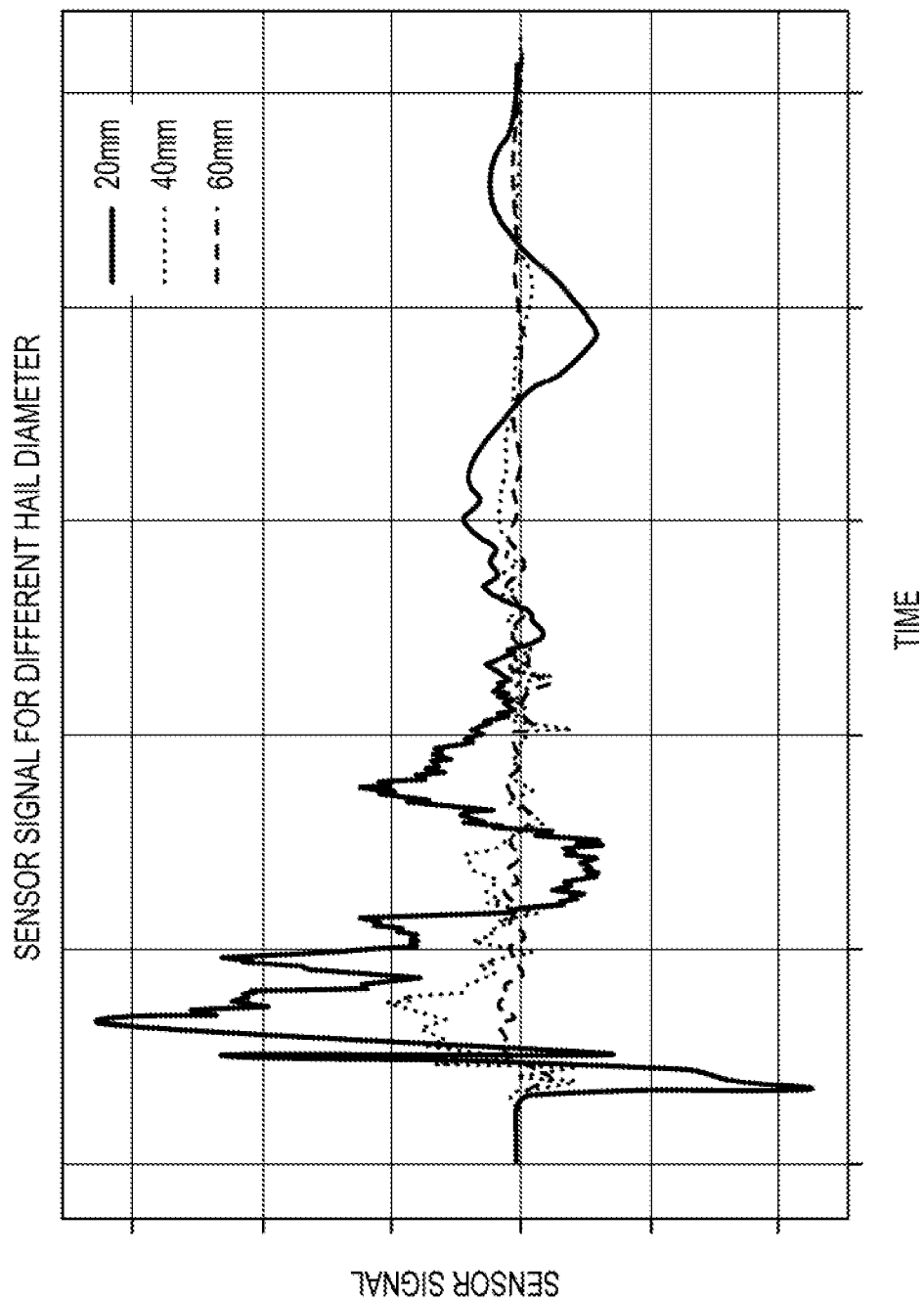

FIG. 2 is a diagram showing an example of raw sensor signals acquired by a central sensor 101 (see FIG. 1), when the laboratory hydrometeor impact varies in diameter from 20 mm to 60 mm with a fixed density.

Figure 3:
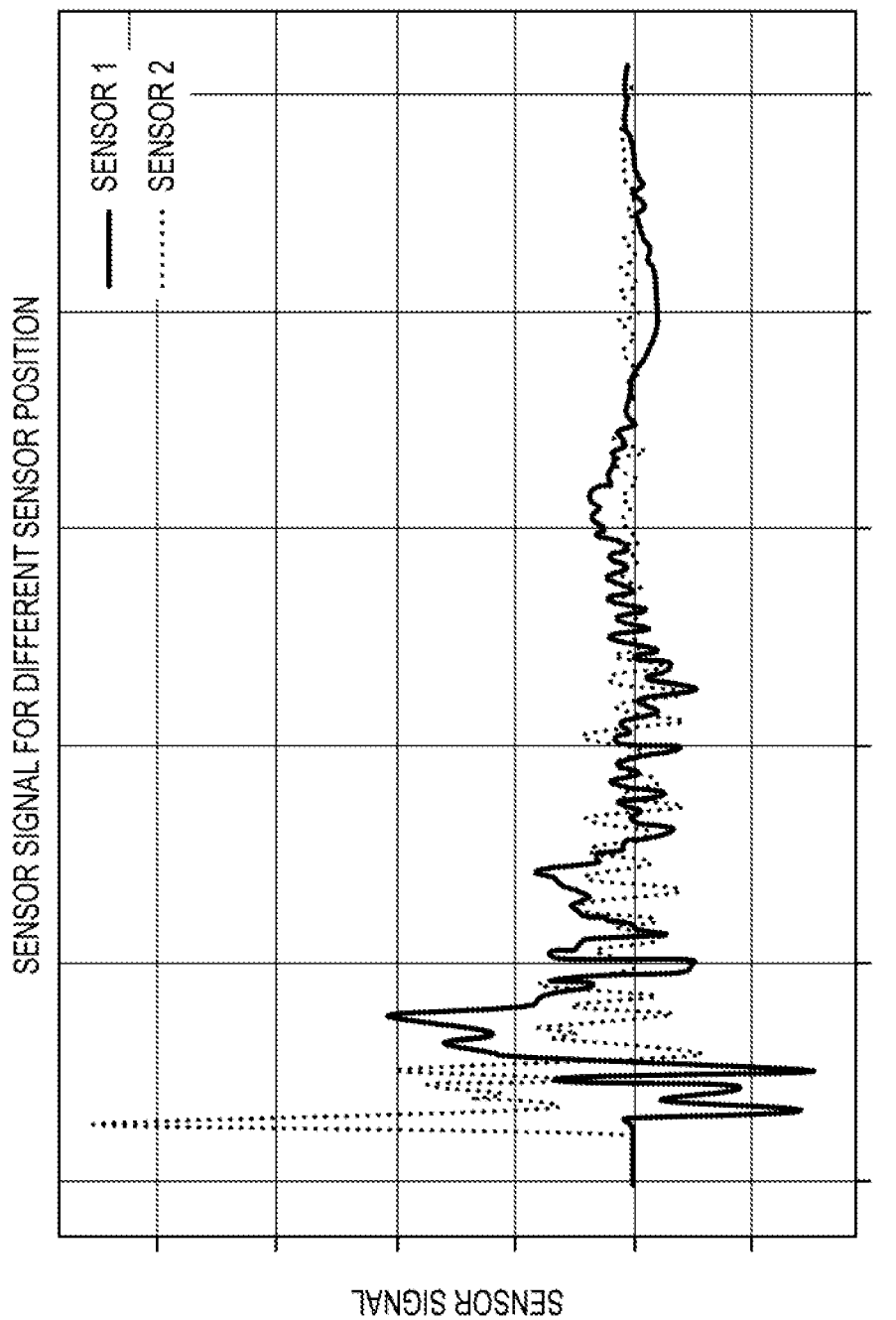

FIG. 3 is a diagram showing an example of raw sensor signals for a laboratory hydrometeor impact at the central position X: 0 mm Y: 0 mm (see FIG. 1) with a diameter or 40 mm, where the central sensor 101 (see FIG. 1) and a secondary sensor 102 (see FIG. 1), at position X: 130 mm Y: 130 mm from center acquire the impact simultaneously. The signal received by the central sensor 101 is significantly stronger.

Figure 4:
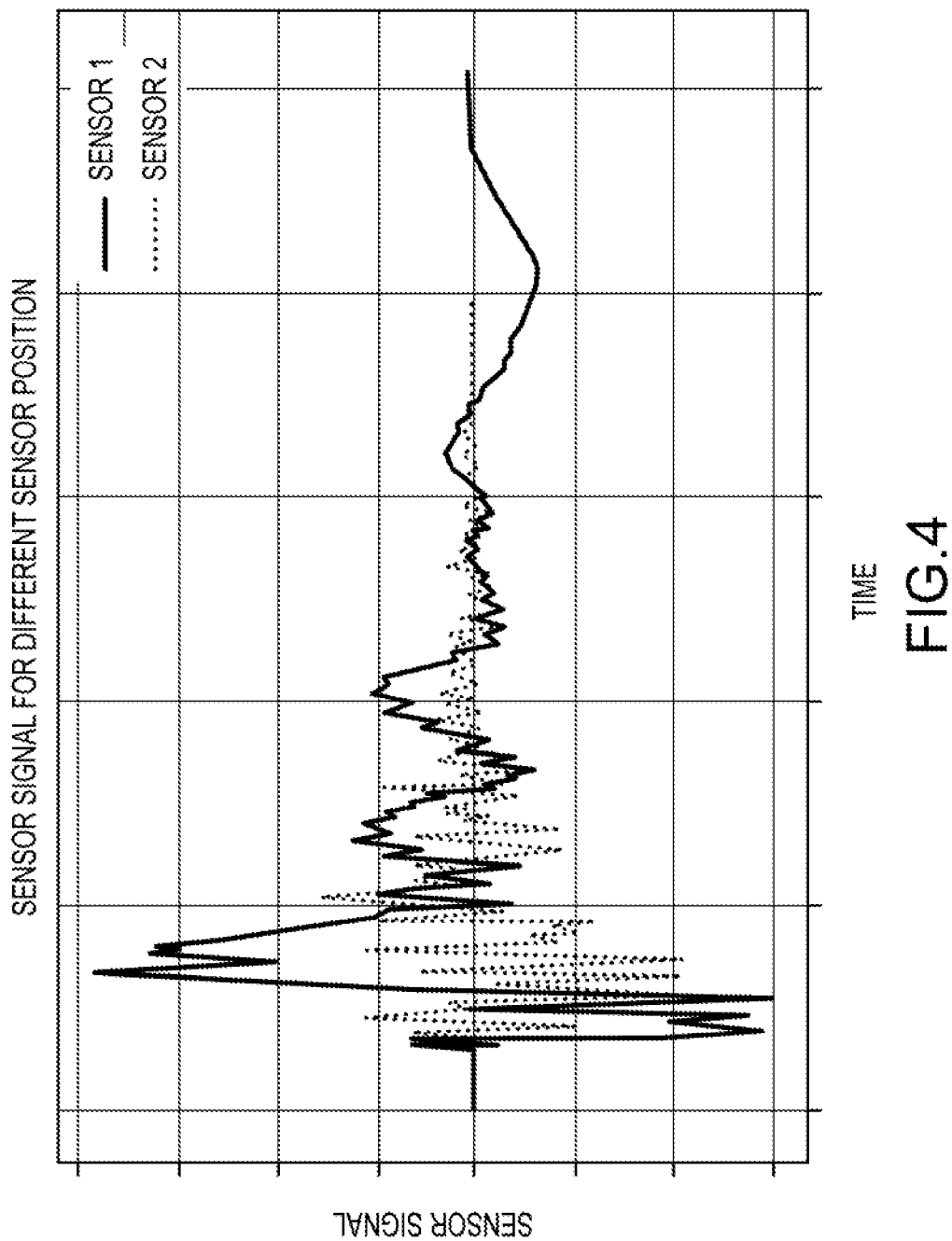

FIG. 4 is a diagram showing an example of raw sensor signals for a laboratory hydrometeor impact at the position X: 130 mm Y: 130 mm (see FIG. 1) with a hydrometeor diameter of 40 mm, where the central sensor 101 (see FIG. 1) and a secondary sensor 102 (see FIG. 1) at position X: 130 mm Y: 130 mm acquire the impact simultaneously. The signals received at the different sensor positions differ in phase but are about the same strength.

Figure 5:
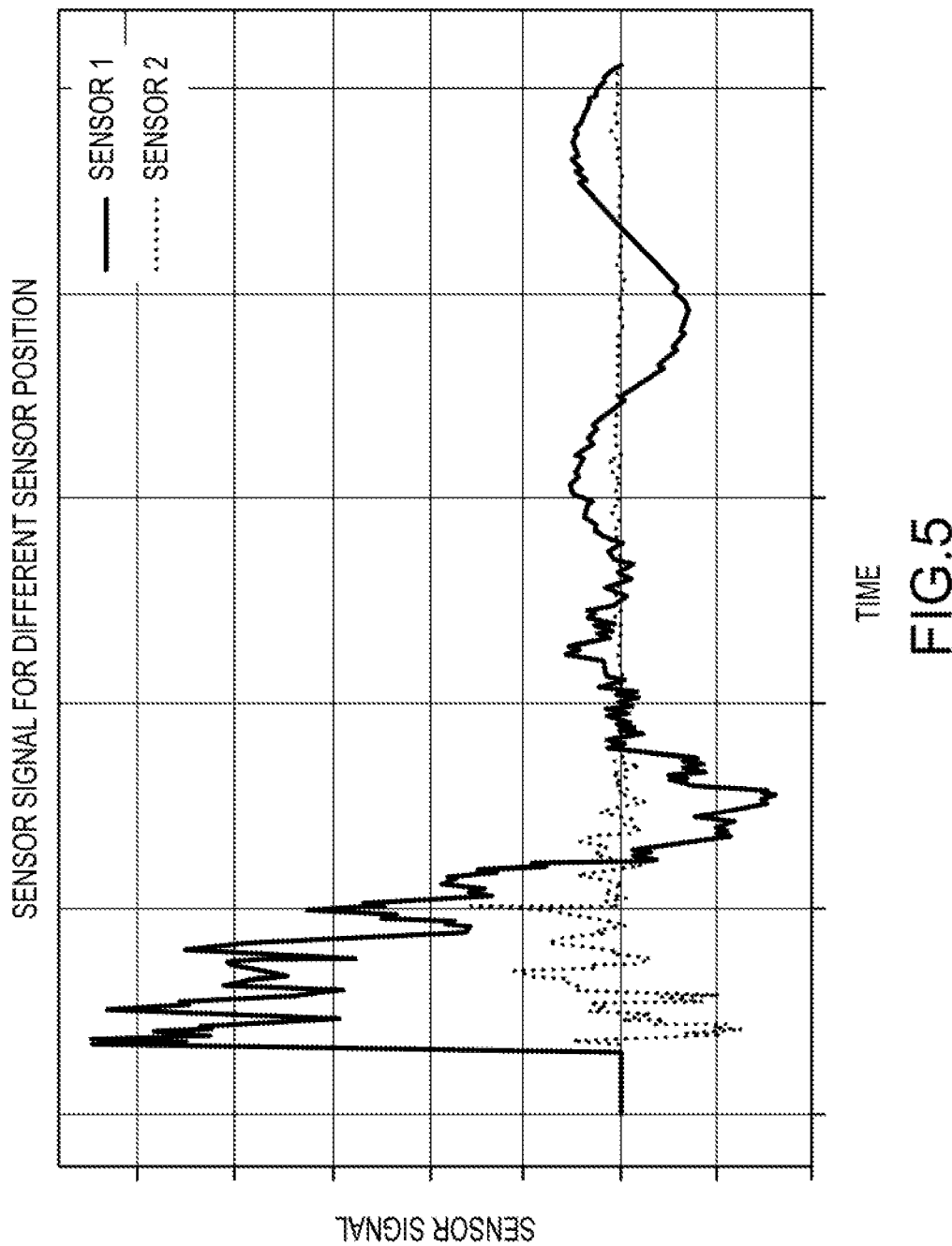

FIG. 5 is a diagram showing an example of raw sensor signals for a laboratory hydrometeor impact at position X: −130 mm Y: −130 mm (see FIG. 1) with a hydrometeor diameter of 40 mm, where the central sensor 101 (see FIG. 1) and a secondary sensor 102 (see FIG. 1) at position X: 130 mm Y: 130 mm acquire the impact simultaneously. The signals received at the different sensor positions differ significantly by both show similar high frequency components.

FIG. 6 is a diagram showing an example of hydrometeor sensor system 601 mounting to a pitched roof surface 605 typically found on residential homes showing its tilt angle 603 and orientation 604. The hydrometeor sensor system 601 includes a computing device or central processing unit 602 which processes raw signals from sensors 101 and 102 (see FIG. 1). Along with raw sensor signals, the computing device 602 has a processor 606*a* that processes signals to detect tilt angle with an on-board accelerometer 606*b*, orientation with an on-board magnetometer 606*c*, and GPS location with an on-board GPS radio 606*d*. These signals are then transmitted to centralized servers 610 via antenna or one or more networking devices 606*e*.

In some embodiments, the sensor system 601 comprises a computing device 602 co-located on or near the sensor structure. The computing device 602 provides real-time signal analysis of the vibration sensors, as well as monitoring of barometric pressure, orientation, tilt, and temperature.

In some embodiments, the computing device 602 comprises on-board memory such as, but not limited to, non-volatile flash memory 602*g*. When on-board memory 602*g* is present in the system 601, it may serve to collect and store all data points collected by the computing device 602. Once full, the on-board computing device 602 utilizes a first in, first out method of overwriting old data with new data, unless the data has not yet been sent to a centralized server. In such a case, the computing device 602 system will try to resend unsent data before overwriting.

In some embodiments, the computing device 602 comprises a real time clock (RTC) 602*f*. The real time clock provides the basis for a date and time for every sensor reading and triggering event.

Furthermore, the computing device 602 RTC 602*f* combined with the on-board memory, stores a date and timestamp for each sensor reading. This system 602 stores the temporal history of an entire event, which is valuable in forensic analysis of an entire storm or extended event.

In some embodiments, the computing device 602 comprises one or more networking devices 602*e*. Networking may crucial to transporting the readings and event data to a centralized server for aggregation and forensic analysis. The networking devices may consist of, but are not limited to, wireless communication (wifi, mesh, Bluetooth, near-field communication (NFC), RFID, Z-wave, Zigbee, LoRaWAN, NB-IOT, 6WLowPAN, cellular, or others), wired communication (serial, Ethernet, Bacnet, Lonworks, Modbus, powerline communication, USB), or others.

Furthermore, when combining the networking device 602*e* with the RTC 602*f* of the computing device 602, the RTC 602*f* may update its time periodically through a protocol such as, but not limited to, network time protocol (NTP) through a network connection 602*e* to a remote server. This keeps the date and time from drifting, and provides the most accurate timestamp when a reading or event is recorded to on-board memory.

In some embodiments, the sensor system 601, 100 connects to a centralized server through its on-board networking device 602*e*. When the sensor system 601, 100 connects to a centralized server, it may use standardized authentication and encryption protocols in order to protect the integrity of the data it sends to the centralized server and also protect the integrity of the centralized server. Data messages sent from a sensor system 601, 100 may always include the time in which it was sent. In the case of a data message resulting from a hydrometeor impact, the timestamp from the event is also sent in order to keep the temporal integrity of the data for analysis.

Furthermore, the centralized server can collect data from two or more sensor systems. When two or more sensor systems are connected to a centralized server, it may be used for predictive and statistical analysis of storms and other weather-related events, including more accurate data, area data, etc.

Furthermore, the collected data from many sensor systems from one or more regional areas may be used in analyzed using machine learning or deep learning methods to better understand the nature of storms and other weather-related events. Because of the scalability and cost of the sensor systems, these methods can aid in the predictive abilities of the collective system to further improve meteorological science, storm forecasting, and tracking.

Figure 7:
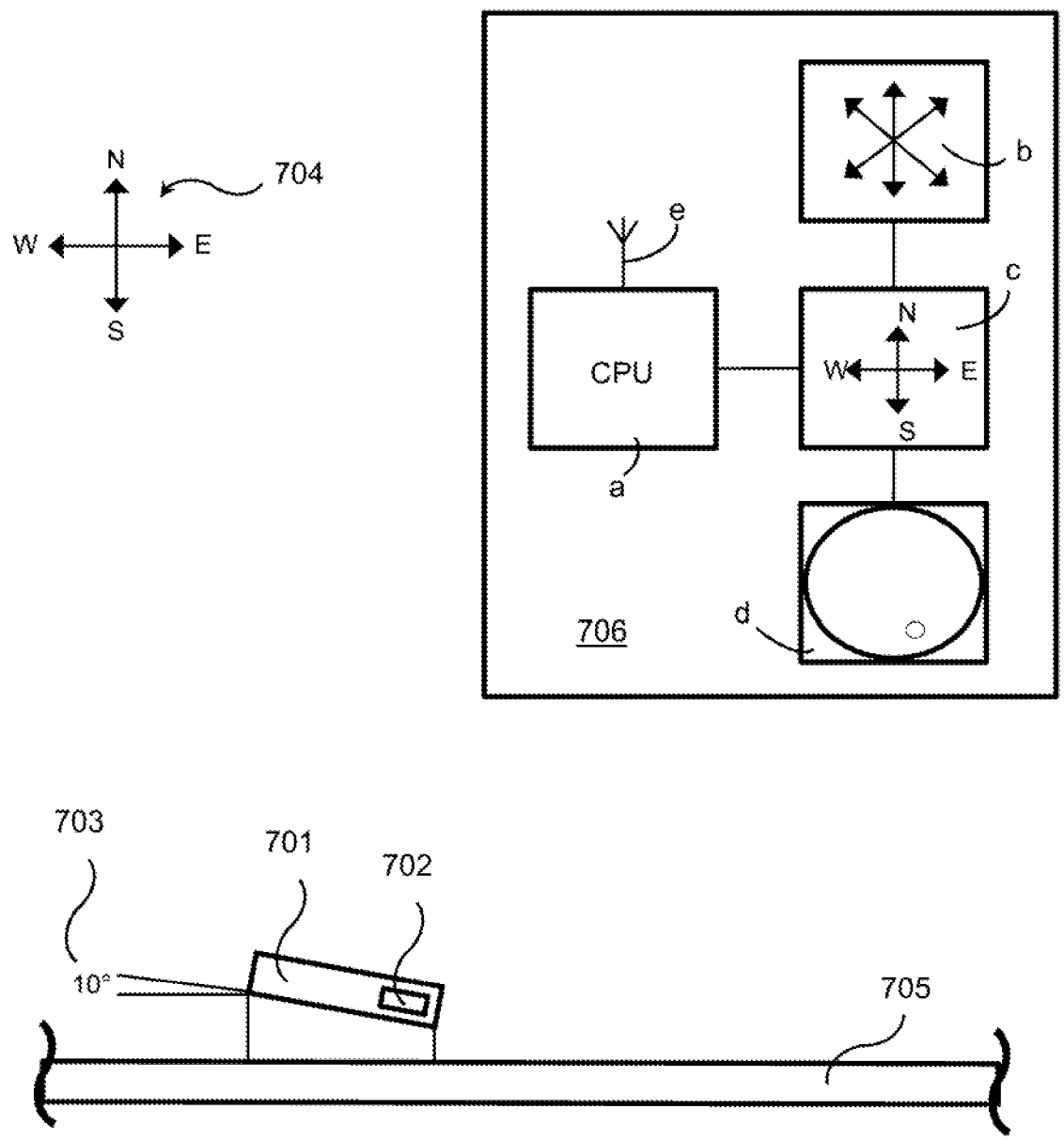

FIG. 7 is a diagram showing an example of hydrometeor sensor system 701 mounting to a flat roof surface 705 typically found on commercial buildings showing its tilt angle 703 and orientation 704. The hydrometeor sensor system 701 may include a computing device 702 which processes raw signals from sensors 101 and 102 (see FIG. 1). Along with raw sensor signals, the computing device 702 has a processor 706a that processes signals to detect tilt angle with an on-board accelerometer 706b, orientation with an on-board magnetometer 706c, and GPS location with an on-board GPS radio 706d. These signals are then transmitted to centralized servers via antenna 706e.

Figure 8:
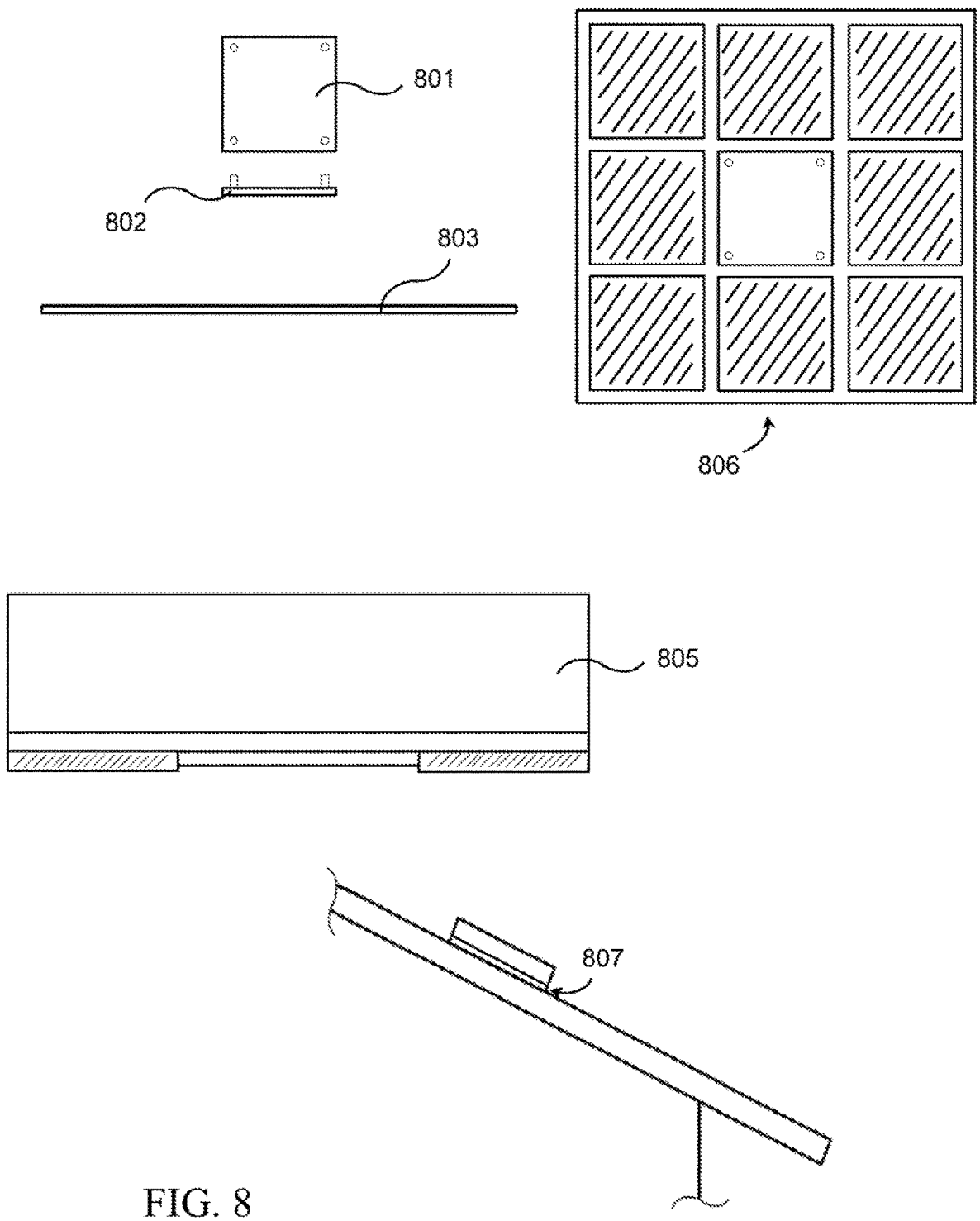

FIG. 8 is a diagram showing an example of a hydrometeor sensor assembly 805, associated example mounting components 801, 803, and 804 mounted to an asphalt shingle roof surface 807 without needing any penetrations. FIG. 8 show the top 801 and side views 802 of one embodiment of a mounting bracket used to secure the hydrometeor sensor to the flexible material. FIG. 8 also shows an example layout 806 of industrial adhesive on the flexible material used to adhere the whole assembly to a pitched roof surface, typically with asphalt shingles. FIG. 8 also shows an example side view 805 of an entire assembly, including a system and mounting.

FIG. 8 depicts an example of the hydrometeor sensor with mounting assembly adhered to an asphalt shingle roof surface. The flexible material 807 is able to match the contours of the variation in roof surface and provide a connection point to the mounting bracket 801 which attaches to the hydrometeor sensor body.

In the embodiments that require roof mounting, the system may be required to be mounted without penetrating the roof structure or barrier layer, especially asphalt shingles on residential homes. In such embodiments, as previously described, a roof mounting system for the sensor system may contain a bracket or hook and loop fastener pads/stripes, a flexible material, and an adhesive, and/or other methods and systems suitable for non-penetration mounting. The purpose of the combined roof mounting system is to provide secured connectivity of the sensor system to the bracket or hook and loop fastener pads/stripes, and a flexible connectivity from bracket or hook and loop fastener pads/stripes to flexible material. The flexible material is then affixed to the roof surface with specialty adhesive to give it the ability to conform to the various textures and layouts of asphalt shingles without compromising the integrity of the roof structure and barrier layer.

Furthermore, if a bracket is used, the bracket is made from one or more pieces of metal or UV stabilized and weather proof polymer based rigid materials. The bracket is affixed to the flexible material through thin slits cut into the material. The bracket is affixed to the panel structure through the use of a clipping mechanism or a fixed fastening mechanism.

Furthermore, if a hook and loop fastener is used, the hook and loop fastener may be made from one or more pieces of UV stabilized and weather proof polymer based materials. The hook and loop fastener may be affixed to the flexible material via industrial adhesive. The hook and loop fastener may be affixed to the sensor via industrial adhesive and also through holes or slits designed into the body of the sensor to secure the sensor.

Furthermore, the flexible material is made from UV stabilized and weather proof materials such as, but not exclusively, fiber-reinforced polymer (FRP) or fiber-reinforced natural rubber (FRNR). The flexible material is able to withstand tensile and shear strengths of 100 psi minimally.

Furthermore, the adhesive is comprised of a synthetic elastomer that bonds to various substrates and creates a permanent seal against moisture, dust, and air intrusion and is highly temperature tolerant, typically −40 F to 250 F. The adhesive is typically used for bonding substrates in the solar, industrial, and automotive markets and provides excellent adhesion to many polar and nonpolar materials.

Figure 9:
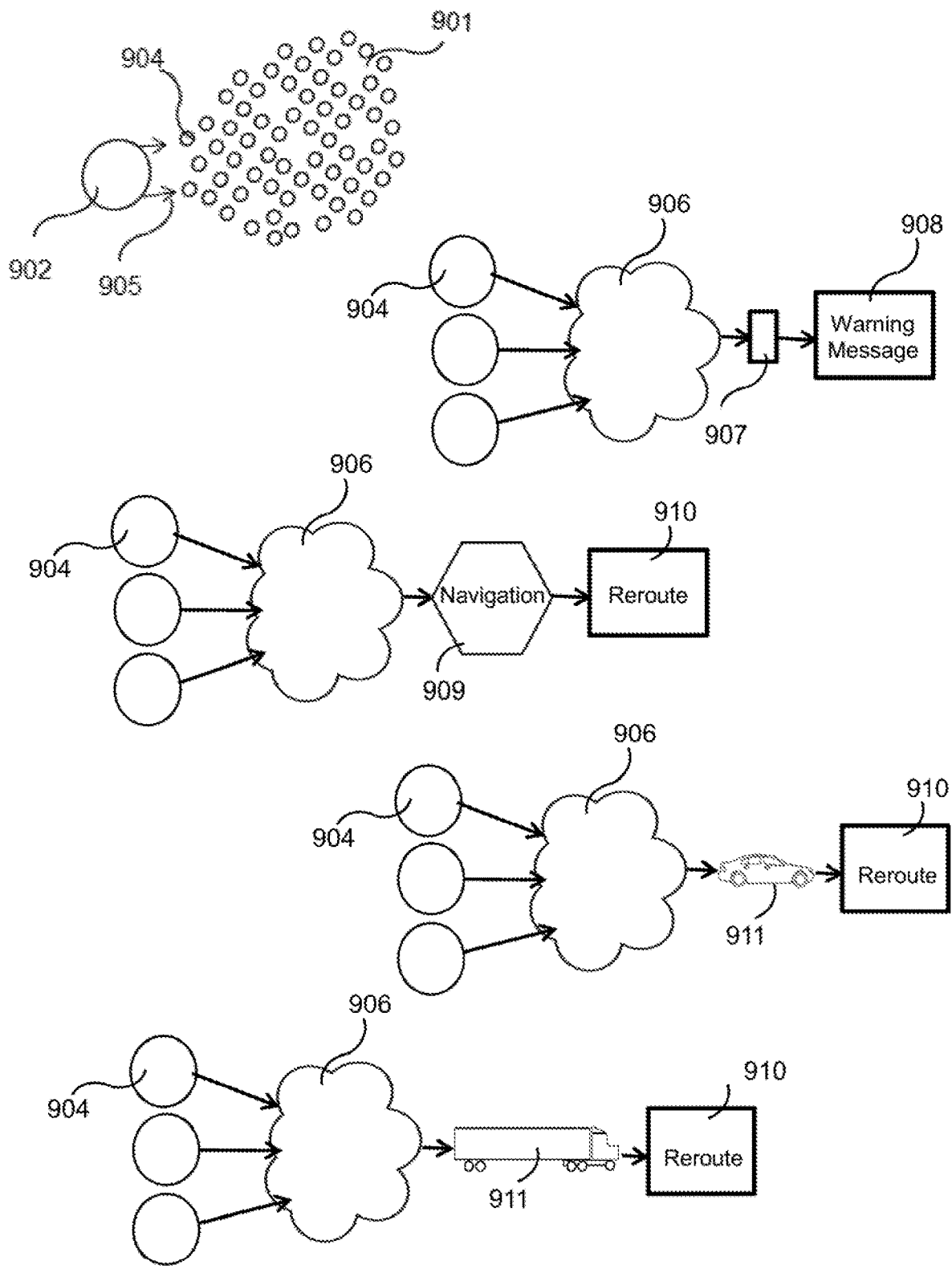

FIG. 9 is a diagram showing an example of an early warning system based upon a network of sensors 901 in an area. When storm cell 902 releases hydrometeors 903 of a significant size and are detected by sensors 904, but not by others 905 in the network, it is possible to predict the direction of the storm cell 902, size of hydrometeors, and frequency of impacts. This information may be important to the creation of preventative measure to protect property and individuals.

In one embodiment, sensors 904 detect hydrometeor impacts of significant size and transmit the data to centralized servers 906 in real-time. Centralized servers 906 are programmed and trained send a signal to mobile phones or radios 907 with a warning message 908 with information and instructions for users of mobile devise or radios 907.

In another embodiment, sensors 904 detect hydrometeor impacts of significant size and transmit the data to centralized servers 906 in real-time. Centralized servers 906 may be configured to send a signal to navigation systems 909 with a message and data to instruct the navigation systems 909 to create a reroute 910 to avoid vehicle damage or personal injury. In an embodiment, navigation systems may be associated with vehicles, airplanes, etc.

In another embodiment, sensors 904 detect hydrometeor impacts of significant size and transmit the data to centralized servers 906 in real-time. Centralized servers 906 are programmed and trained to send a signal to autonomous automobiles 911 with a message and data to instruct the autonomous automobiles 911 to create a reroute 910 to avoid vehicle damage or personal injury.

In another embodiment, sensors 904 detect hydrometeor impacts of significant size and transmit the data to centralized servers 906 in real-time. Centralized servers 906 are programmed and trained to send a signal to logistics vehicles 912 with a message and data to instruct the logistics vehicles 912 to create a reroute 910 to avoid vehicle damage, cargo damage or personal injury.

In some embodiments, with many sensors in a regional area, it is possible to generate early warning notifications to various entities such as, but not exclusively, government entities and private entities.

In the case of government entities, a warning system may be used in several applications, but not exclusively, to alert the general public of incoming storm threats, assistance to aviation entities both for ground crew and also incoming/outbound aircraft safety, and disaster response.

In the case of private entities, a warning system may be used in several applications, but not exclusively, to alert its users or customers of incoming storm threats and provide actionable advice, in automation of preventative devices to reduce property damage, in automation of preventative methods to reduce property damage, in automation methods on autonomous vehicles to prevent vehicle damage, in automation methods on navigational systems to avoid damage or injury, and in automation methods on logistics vehicles to avoid damage or delay.

Figure 10:
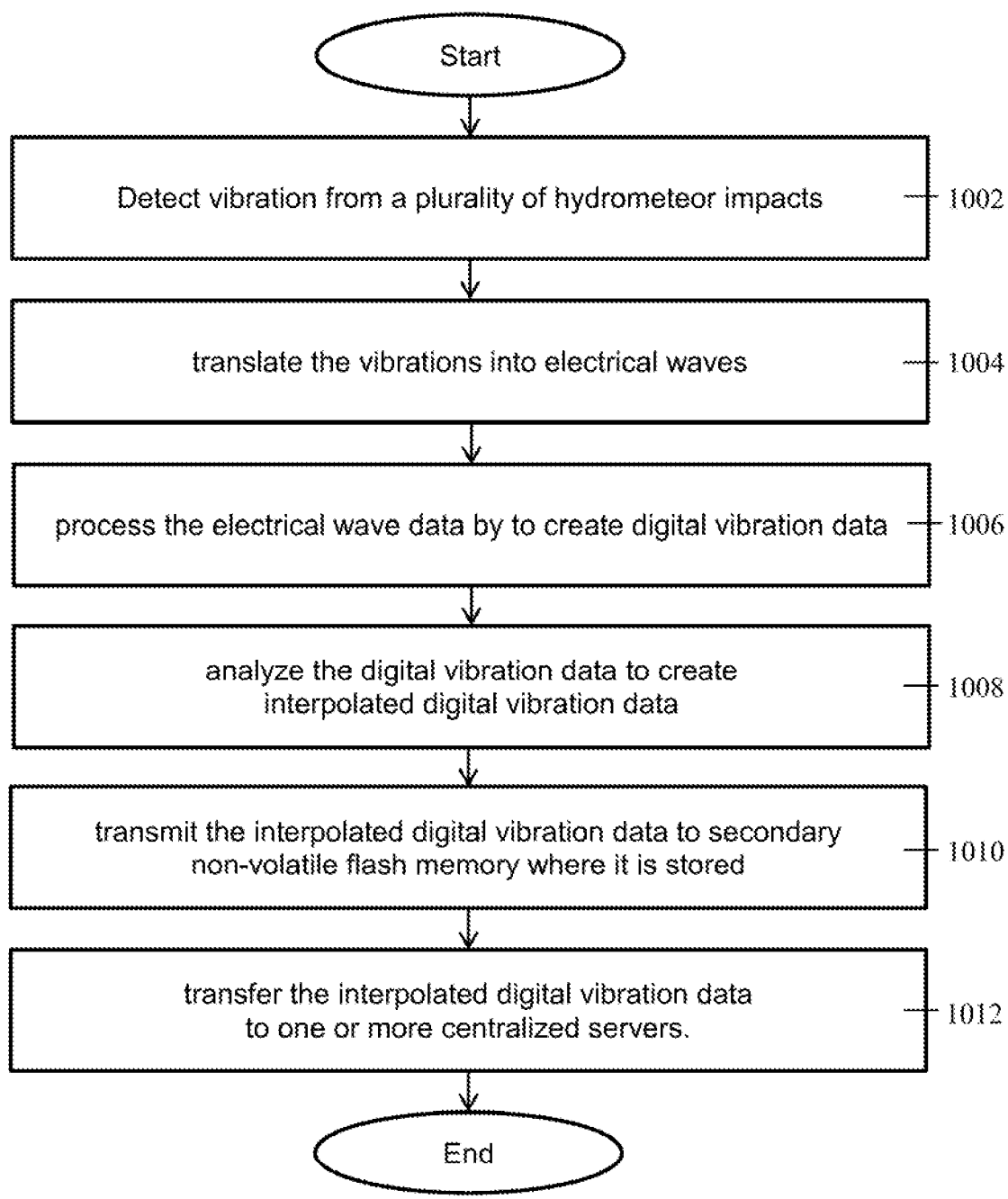

FIG. 10 is a flow diagram method for detecting weather event(s), and creating data related to the weather event(s). Upon impact from a hydrometeor on the impact surface, vibrations are detected 1002, and then translated into electrical waves by the sensors attached to the impact surface 1004.

Raw sensor signals are then processed by the ADC 1006, which converts the analog electrical waves into digital vibration data. Once in digital format, the digital vibration data is transferred to an on-board CPU, which analyzes and/or interpolates various attributes of the digital vibration data, to estimate information, such as hydrometeor size or velocity, from an on-board lookup table 1008, to create interpolated digital vibration data.

After the attributes have been estimated and/or interpolated, this interpolated digital vibration data is transmitted to secondary non-volatile flash memory where it is stored 1010 and will be transferred 1012 to centralized servers 610 for further analysis or may be recalled from the device at a later time.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g., the use of a certain component described above alone or in conjunction with other components may comprise a system, while in other aspects the system may be the combination of all of the components described herein, and in different order than that employed for the purpose of communicating the novel aspects of the present disclosure. Other variations and modifications may be within the skill and knowledge of those in the art, after understanding the present disclosure. This method of disclosure is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A hydrometeor damage potential information capturing and processing system, comprising:
    a plate comprising an upper surface and a lower surface, configured to vibrate when a hydrometeor impacts the upper surface;
    a plurality of sensors, directly coupled to the plate, configured to translate the vibrations into electrical wave data, wherein the plurality of sensors are coupled adjacent the lower surface of the plate, wherein the plurality of sensors are placed in a way that the impact position of the hydrometeor can be calculated through the differences of the vibrations;
    an analog-to-digital converter, communicatively coupled to the plurality of sensors, configured to receive and convert the electrical wave data to digital vibration data;
    a central processing unit, communicatively coupled to the analog-to-digital converter, configured to:
    receive the digital vibration data;
    analyze the digital vibration data, at least in part by interpolating attributes of the digital vibration data to a lookup table accessible by the central processing unit to create interpolated digital vibration data;
    create composite data from the interpolated digital vibration data;
    send the composite data to non-volatile flash memory to be stored; and
    transfer the composite data to one or more centralized servers via one or more networks for further analysis,
    wherein the composite data comprises one or more of kinetic energy, impact position, or density of the impacting hydrometeors, and wherein the system comprises an early warning system based upon a network of hydrometeor damage potential information capturing and processing systems, wherein when a storm cell releases hydrometeors of a predetermined threshold, which are detected by the network of hydrometeor damage potential information capturing and processing systems, the system accurately predicts and defines the direction of the storm cell and the frequency of the impacts.

2. The system of claim 1, wherein at least one of the plurality of sensors is coupled adjacent to the center of the lower surface of the plate.

3. The system of claim 1, wherein the upper and lower surfaces of the plate are square shaped.

4. The system of claim 1, wherein the upper and lower surfaces of the plate are rectangular shaped.

5. The system of claim 1, wherein the lower surface of the plate is mounted to a roof surface.

6. The system of claim 1, wherein the upper plate surface comprises, at least in part, solar electric panels.

7. The system of claim 1, wherein the upper plate surface comprises, at least in part, roofing materials or products.

8. The system of claim 1, wherein the upper plate surface comprises, at least in part, ventilation materials or products.

9. The system of claim 1, wherein the upper plate surface comprises, at least in part, heating ventilation and air conditioning_('HVAC") materials.

10. The system of claim 1, wherein the sensors comprise at least one of the following data recording devices:
    piezoelectric accelerometers;
    piezoresistive accelerometers;
    capacitive MEMS;
    strain gauges;
    pressure sensors;
    laser displacement sensors;
    eddy current sensors; or
    capacitive displacement sensors.

11. The system of claim 1, wherein the digital vibration data is filtered to create signal energy data, wherein the signal energy data extracts the signal components correlating best with the intensity of the plurality of hydrometeors impacts, and wherein the signal energy data is used as the main hydrometeor intensity gauging feature.

12. The system of claim 1, further comprising a global positioning system radio and antenna, wherein the global positioning system radio and antenna provides accurate coordinate location data.

13. The system of claim 12, further comprising a barometric pressure sensor that can provide accurate altitude for the plurality of sensors location.

14. The system of claim 1, wherein the central processing unit provides real-time signal analysis of the plurality of sensors, and monitors barometric pressure, orientation, tilt, and temperature, along with additional add-on sensors that may be deployed.

15. The system of claim 1, further comprising the network of hydrometeor information capturing and processing systems, located in a regional area, collectively used as an early warning system, wherein the early warning system transmits a plurality of visual data and information to the one or more centralized servers via one or more networking devices, and wherein the centralized servers send a plurality of signals with a warning message to mobile computing devices of end users.

16. The system of claim 1, wherein the upper and lower surface of the plate are round shaped.

17. The system of claim 1, wherein the plate is comprised of a solar electric panel.

18. A method of capturing and processing hydrometeor damage potential information comprising:
   collecting a plurality of vibrations from a plurality of hydrometeor impacts on an upper surface of a plate;
   transferring the plurality of vibrations through the plate to a plurality of sensors, coupled to a lower surface of the plate, wherein the plurality of sensors are placed in a way that the impact position of the hydrometeor can be calculated through the differences of the vibrations;
   translating the vibrations by the plurality of sensors into electrical wave data;
   sending the electrical wave data to an analog-to-digital converter via a communication link;
   converting the electrical wave data to digital vibration data at the analog-to-digital converter;
   sending the digital vibration data to an on-board central processing unit via the communication link;
   processing the digital vibration data by the on-board central processing unit, wherein the on-board central processing unit analyzes the digital vibration data, at least in part by interpolating attributes of the digital vibration data to a lookup table accessible by the central processing unit to create interpolated digital vibration data, wherein the interpolated digital vibration data is sent to secondary non-volatile flash memory where it is stored; and wherein the interpolated digital vibration data is transferred to one or more centralized servers via one or more networking devices for further analysis;
   creating composite data from the interpolated digital vibration data;
   sending the composite data to non-volatile flash memory to be stored; and
   transferring the composite data to one or more centralized servers via one or more networks for further analysis, wherein the composite data comprises one or more of impact location, kinetic energy, or density of the impacting hydrometeors, and wherein the method comprises configuring an early warning system based upon a network of hydrometeor damage potential information capturing and processing systems, wherein when a storm cell releases hydrometeors of a predetermined threshold, which are detected by the network of hydrometeor damage potential information capturing and processing systems, the method accurately predicts and defines the direction of the storm cell and the frequency of the impacts.

19. A hydrometeor damage potential information capturing and processing system comprising:
   a plate comprising an upper surface and a lower surface, configured to vibrate when a hydrometeor impacts the upper surface, wherein the plate has a planar shape;
   a plurality of sensors, coupled adjacent the plate, configured to translate the vibrations into electrical wave data, wherein the plurality of sensors are coupled adjacent the lower surface of the plate, wherein the plurality of sensors are placed in a way that the impact position of the hydrometeor can be calculated through the differences of the vibrations;
   an analog-to-digital converter, communicatively coupled to the plurality of sensors, configured to receive and convert the electrical wave data to digital vibration data;
   a central processing unit, communicatively coupled to the analog-to-digital converter, configured to
   receive the digital vibration data;
   analyze the digital vibration data, at least in part by interpolating attributes of the digital vibration data to a lookup table accessible by the central processing unit to create interpolated digital vibration data;
   create composite data from the interpolated digital vibration data;
   send the composite data to non-volatile flash memory to be stored; and
   transfer the composite data to one or more centralized servers via one or more networks for further analysis, wherein the composite data comprises one or more of impact location, kinetic energy, or density of the impacting hydrometeors, and
   wherein the system comprises an early warning system based upon a network of hydrometeor damage potential information capturing and processing systems, wherein when a storm cell releases hydrometeors of a predetermined threshold, which are detected by the network of hydrometeor damage potential information capturing and processing systems, the system accurately predicts and defines the direction of the storm cell and the frequency of the impacts.

20. The system of claim 19, wherein the digital vibration data collected from the plurality of sensors are combined to create a single intensity feature that averages the signal strength, thus removing the probability of over excitement of the plurality of vibration sensors.

21. The system of claim 19, wherein the positioning of the plurality of sensors captures a variation in vibrations from the plurality of hydrometeor impacts to increase accuracy of the captured vibrations.

* * * * *